United States Patent Office 3,409,513
Patented Nov. 5, 1968

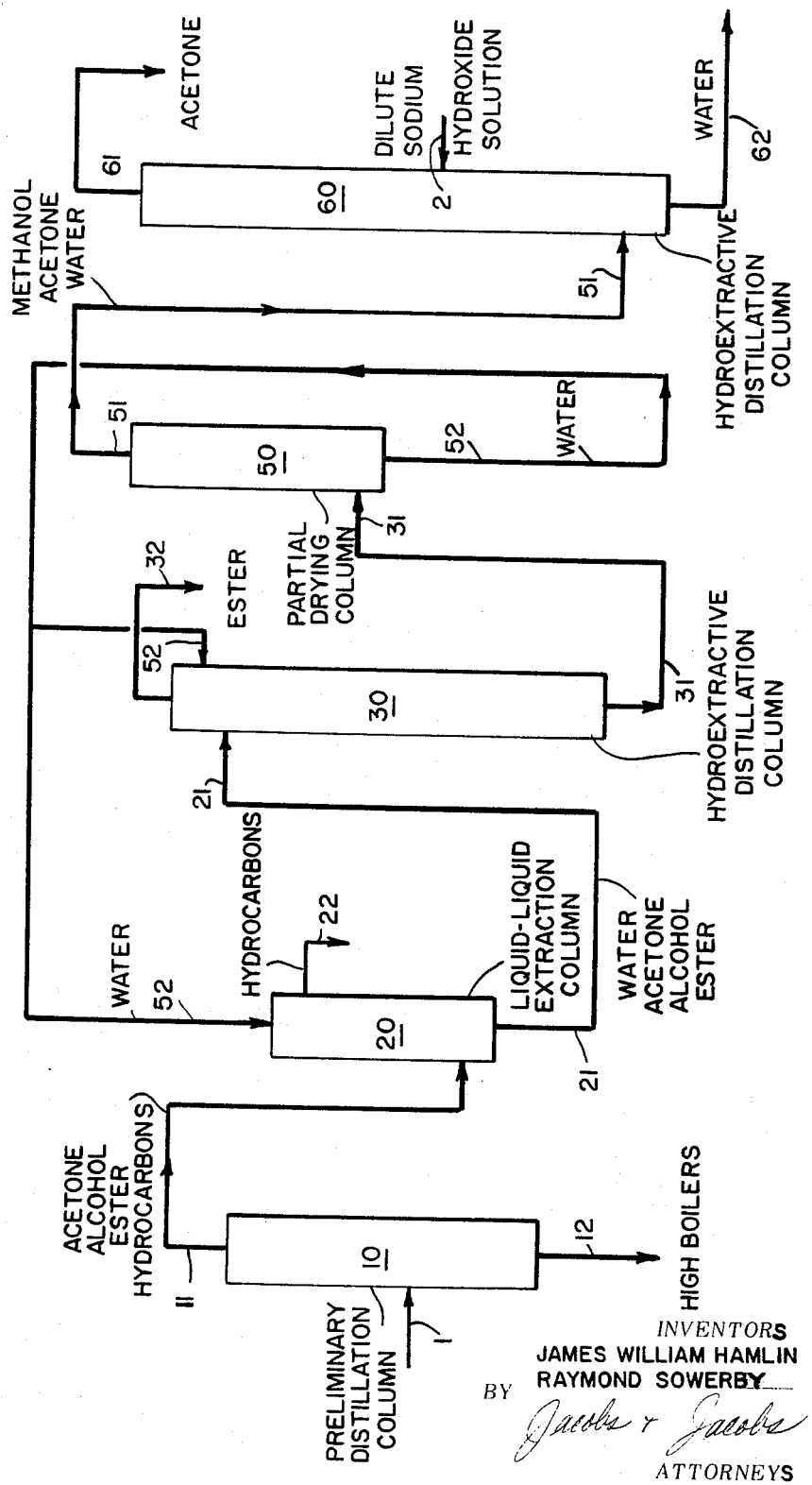

3,409,513
PURIFICATION OF ACETONE BY HYDRO-
EXTRACTIVE DISTILLATION
James William Hamlin and Raymond Sowerby, Hull, England, assignors to The Distillers Company Limited, Edinburgh, Scotland, a British company
Filed Nov. 3, 1965, Ser. No. 506,156
Claims priority, application Great Britain, Nov. 27, 1964, 48,279/64
5 Claims. (Cl. 203—46)

ABSTRACT OF THE DISCLOSURE

Acetone of substantially pure form can be obtained from a mixture comprising acetone, at least one lower aliphatic alcohol, at least one ester of a lower aliphatic alcohol with a lower carboxylic acid and at least one hydrocarbon by subjecting the mixture to liquid-liquid extraction to remove the at least one hydrocarbon, followed by hydro-extractive distillation, thereafter the acetone being removed as an overhead product. Alternatively a second hydro-extractive distillation step can be used and the acetone can then be recovered subsequent to the second hydro-extractive distillation. An optional preliminary distillation can be used before the liquid-liquid extraction step to remove high boilers and an optional drying step may be utilized after the initial hydro-extractive distillation step.

---

Figure 1:
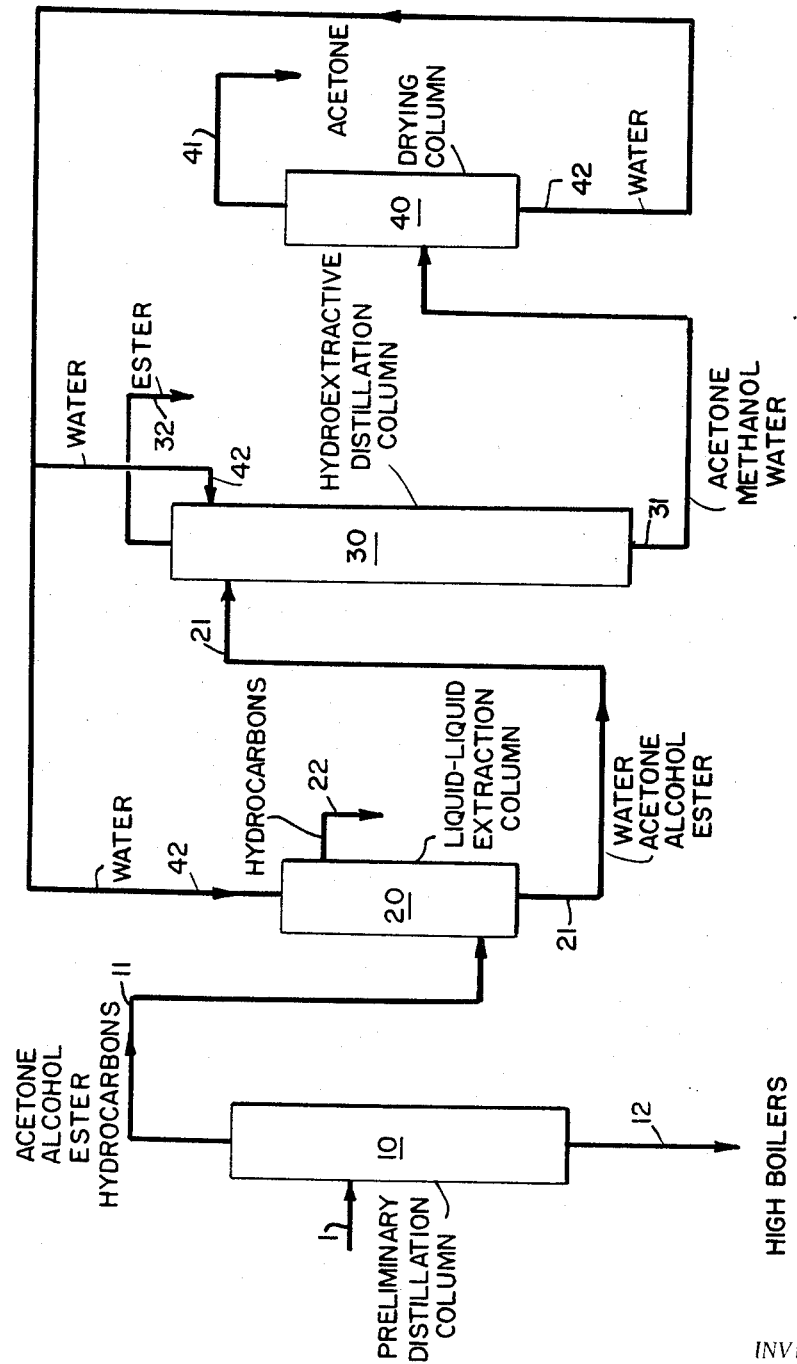

This invention relates to hydro-extractive distillation, particularly to the hydro-extractive distillation of mixtures comprising acetone, lower aliphatic alcohols, and esters of lower aliphatic alcohols with lower carboxylic acids, and which originally contain hydrocarbons, especially aliphatic hydrocarbons having at least 7 carbon atoms.

Throughout the specification and claims, by the expressions "lower aliphatic alcohols" and "esters of lower aliphatic alcohols with lower carboxylic acids" is meant compounds having not more than 8 carbon atoms.

Such complex mixtures containing hydrocarbons arise for example from the oxidation of a light distillate petroleum fraction to produce lower aliphatic acids.

The separation of pure acetone from such mixtures is difficult since acetone, methyl acetate and methanol form azeotropes with one another and with other components of the mixture. Simple distillation of such a mixture only gives a crude fraction comprising acetone, methyl acetate and methanol, boiling at 55.5–56.5° C.

Such a mixture, if subjected to a normal hydro-extractive distillation, with the object of removing overhead the components other than water, acetone and methanol, yields only poor quality acetone when the water, acetone and methanol mixture is worked up.

It is an object of the present invention to provide an improved process for the hydro-extractive distillation of such mixtures.

The present invention is based on the surprising discovery that the presence of hydrocarbons in such mixtures interferes with the hydro-extractive distillation, resulting in poor quality acetone.

Accordingly, the present invention provides a process for the partial purification of acetone from a mixture comprising acetone, at least one lower aliphatic alcohol, at least one ester of a lowre aliphatic alcohol with a lower carboxylic acid and at least one hydrocarbon, which comprises the removal of hydrocarbons present in the mixture, as organic phase, by liquid-liquid extraction with water, followed by hydro-extractive distillation of the aqueous phase resulting from the liquid-liquid extraction.

The process is particularly useful for recovering acetone from mixtures comprising acetone, methanol, methyl acetate and hydrocarbons.

Although the process of the invention can be advantageously operated when the original starting material contains any hydrocarbons, it is particularly useful when the hydrocarbons are aliphatic compounds having at least seven carbon atoms.

The liquid-liquid extraction can be preceded if desired by tailing to remove higher boiling components of the mixture.

The liquid-liquid extraction can be effected, for example, in a packed column.

The hydro-extractive distillation is preferably effected with a sufficient quantity of water to maintain a liquid phase composition of more than 80 percent mole of water.

The mixture of water, acetone and methanol leaving the hydro-extractive distillation stage can, if desired, be dried.

Alternatively, because of the removal of hydrocarbons from the original crude product prior to hydro-extractive distillation, the acetone can readily be recovered in pure form from the mixture of acetone, water and methanol by a further simple hydro-extractive distillation to remove acetone overhead, preferably preceded by a partial drying stage to remove excess water. It has been found particularly advantageous in this second hydro-extractive distillation to distil in the presence of an alkali, preferably sodium hydroxide supplied to the column as a weak solution, for example, 0.5% w./w. in water. Sufficient water is used, preferably, to maintain a liquid phase composition of about 60 mole percent water.

Water recovered in such drying operations, can be recycled to the liquid-liquid extraction stage, or the hydro-extractive distillation stage or, preferably, to both.

The invention will now be further described with reference to the accompanying diagrammatic drawings in which FIG. 1 represents a 4 column distillation train for the production of acetone containing 2–3% methanol from the oil phase of a mixture containing hydrocarbons, methyl acetate, acetone, methanol, benzene, ethyl methyl ketone, methyl n-propyl ketone, water, acetic acid and other components;

FIG. 2 represents a 5 column distillation train for the production of acetone free from methanol from such a mixture.

In both FIG. 1 and FIG. 2 column 10 is a tailing still fed by line 1 and is fitted with a vapor splitting head. The base product of column 10 is removed by line 12. The overhead product is fed by line 11 to the base of column 20, a liquid-liquid extraction column. The overhead product of column 20 is removed by line 22, and the base product by line 21, which feeds column 30, a hydroextractive distillation column. The overhead product of column 30 is removed by line 32, and the base product by line 31. In FIG. 1, line 31 feeds column 40, from which the overhead product is removed by line 41 and the base product is recycled by line 42 to the tops of columns 20 and 30.

In FIG. 2, line 31 feeds column 50. The base product of column 50 is recycled by line 52 to the tops of columns 20 and 30. The overhead product is removed by a vapor splitting head and fed by line 51 to column 60. Line 2 also feeds column 60. The overhead product is removed by line 61, the base product by line 62.

The following examples illustrate the invention, using apparatus described above.

EXAMPLE 1

In this example, apparatus described with reference to FIGURE 1 of the drawing was used. 10 kg. of a mixture having the composition set forth in Table 1 column A was

*Table I*

| Component | Approx. Amount (percent by weight) | |
|---|---|---|
| | A | B |
| Hydrocarbons | 13.2 | 10.0 |
| Methyl acetate | 7.3 | 6.5 |
| Acetone | 37.5 | 45.6 |
| Benzene | 10.7 | 7.0 |
| Ethylmethyl ketone | 5.2 | 5.0 |
| Methyl n-propyl ketone | 3.3 | 4.3 |
| Water | 5.5 | 9.1 |
| Acid (as acetic) | 3.7 | 1.1 |
| Others (15) | 13.6 | 11.4 | preheated to 53–54° C. and fed into column 10 by line 1 at a rate of about 450 ml./hr. Column 10 was operated at a reflux ratio of 1:1 with a base temperature of 78–80° C. and a head temperature of 53–55° C. A total of 3333 g. of base product was removed by line 12 and was found to have the percentage composition set forth in column A of Table II.

*Table II*

| Component | Approx. Amount (percent) | |
|---|---|---|
| | A | B |
| Methyl acetate plus acetone | 10.8 | 17.7 |
| Ethyl acetate | 6.9 | 7.8 |
| Ethyl methyl ketone | 15.8 | 15.9 |
| Benzene | 5.2 | 6.6 |
| Methyl n-propyl ketone | 13.4 | 17.3 |
| Water | 7.6 | 7.6 |
| Acid (as acetic) | 8.1 | 3.4 |
| Others (30) | 32.2 | 23.7 |

Column 20 was operated at a temperature of 20° C., although it is contemplated that higher temperatures would also give useful results. The feed through line 42 was water together with accumulated solutes (process water), at a rate of 400–500 ml./hr. 1912 g. of product, having the composition set forth in column A of Table III, was removed by line 22.

*Table III*

| Component | Approx. Amount (percent) | |
|---|---|---|
| | A | B |
| n-Pentane | 5.7 | 6.9 |
| n-Hexane | 20.5 | 22.0 |
| n-Heptane | 16.1 | 9.5 |
| Acetone | trace | |
| Benzene | 21.5 | 24.8 |
| Water | 0.03 | 0.03 |
| Others | 36.2 | 36.8 |

Column 20 was operated at a reflux ratio of 10:1, a base temperature of 84°–86° C. and a head temperature of 51°–54° C. Recycled process water from the base of column 40 was fed into column 30 by line 42 at a temperature of 25°–30° C. The temperature of the feed in line 21 was 20° C. The overhead product, removed through line 32, amounted to 1429 g., and had the approximate percentage composition set forth in Column A of Table IV.

*Table IV*

| Component | Approx. Amount (percent) | |
|---|---|---|
| | A | B |
| Aliphatic hydrocarbons | 0.7 | 0.1 |
| Acetaldehyde | 2.4 | 0.3 |
| Propionaldehyde | | 0.1 |
| Methyl formate | 8.7 | 2.9 |
| Ethyl formate | 4.7 | 2.9 |
| Methyl acetate | 38.4 | 25.5 |
| Acetone | 36.2 | 59.2 |
| Benzene | 3.6 | 5.0 |
| Water | 3.7 | 3.5 |
| Others (4) | 1.6 | 0.2 |

Column 40 was operated at a reflux ratio of 3:1, with a base temperature of 98–99° C. and a head temperature of 56.5° C. The feed temperature was about 30° C. The base product was process water. The overhead product amounted to 3109 g., and had the composition set forth in column A of Table V. The amount of material lost in the distillation train was 307 g.

*Table V*

| Component | Amount (percent by weight) | |
|---|---|---|
| | A | B |
| Aliphatic hydrocarbons | | Trace |
| Methyl acetate | | 0.2 |
| Acetone | 96.6 | 97.55 |
| Propionaldehyde | | Trace |
| Methanol | 2.5 | 1.5 |
| Water | 0.7 | 0.7 |
| Ethyl Acetate | 0.1 | Trace |
| Methyl Ethyl ketone | 0.2 | Trace |

EXAMPLE 2

In this example, apparatus described with reference to FIGURE 1 of the drawings was used. 10 kg. of a mixture having the composition set forth in column B of Table 1 was preheated to 53–54° C. and fed into column 10 by line 1 at a rate of 400–430 ml./hr. Column 10 was operated at a reflux ratio of 1:1 with a base temperature of 78–81° C. and a head temperature of 53–55° C. A total of 3207 g. base product was removed by line 12 and found to have the composition set forth in column B of Table II.

Column 20 was operated at a temperature of 20° C. The feed through line 42 at a rate of 400–500 ml./hr. 1447 g. of product, having the composition set forth in column B of Table III, was removed by line 22.

Column 30 was operated at a reflux ratio of 10:1, a base temperature of 89°–91° C. and a head temperature of 53°–55° C. Recycled process water from the base of column 40 was fed into column 30 by line 42 at a temperature of 25°–30° C. The overhead product, removed through line 32 amounted to 1944 g., and had the composition set forth in column B of Table IV.

Column 40 was operated under the same conditions as in Example 1. The overhead product amounted to 3171 g., and had the composition set forth in column B of Table V. The amount of material lost in the distillation train amounted to 231 g.

EXAMPLE 3

In this example column 60, described above with reference to FIGURE 2 was operated alone, the feedstock being the product of Example 1, fed through line 51 at a rate of 100/ml./hr. The column was operated at a reflux ratio of 3:1, and water was fed in through line 2 at a rate of 150 ml./hr. The overhead product distilled between 55.9° C. and 56.4° C., had a water content of 0.5–0.6%, had a permanganate time of 15 minutes and passed the Agulhon test (less than half B.S. limit). The overhead product was 99.1% acetone, 0.1% methyl acetate, together with traces of aliphatic hydrocarbons, ethyl acetate, benzene and an unknown contaminant. Methanol was not present.

EXAMPLE 4

In this example, apparatus described with reference to FIG. 2 was used. 10 kg. of a mixture having the composition set forth in Table VI was used.

Table VI

| | Percent w./w. |
|---|---|
| Aliphatic hydrocarbons | 7.5 |
| Methyl formate | 1.4 |
| Methyl acetate | 6.1 |
| Acetone | 55 |
| Methanol | 1 |
| Benzene and ethyl acetate | 10.1 |
| Ethyl methyl ketone | 3.6 |
| Methyl n-propyl ketone | 3.0 |
| Water | 6.6 |
| Acid (as acetic) | 0.7 |
| Others (13 components) | 5.0 |

The mixture was fed into column 10 by line 1 at a rate of 400 ml./hr. and a temperature of 54° C. The base temperature was 78–80° C. while the head temperature was 55° C. The reflux ratio was 1:1. The base product comprised 1540 g. of oil layer and 566 g. aqueous layer. The composition of the oil layer is given in Table VII.

Table VII

| Column 1 base product (oil layer): | Percent w./w. |
|---|---|
| Acetone | 5.7 |
| Ethyl acetate | 6.2 |
| Methyl propionate | 3.3 |
| Ethyl methyl ketone+diacetyl+methyl vinyl ketone | 16.5 |
| Benzene | 3.5 |
| Methyl isopropyl ketone | 3.6 |
| n-Propyl acetate | 2.7 |
| Methyl n-propyl ketone+diethyl ketone | 27.3 |
| Toluene | 4.7 |
| Ethyl propyl ketone | 5.0 |
| Methyl n-butyl ketone | 5.3 |
| Water | 5.5 |
| Acid (as acetic) | 0.3 |
| Others (16 components) | 10.4 |

Column 20 was operated at a temperature of 20° C. and a water feed rate of about 300 ml./hr. 1425 g. of hydrocarbon phase were obtained, having the composition shown in Table VIII.

Table VIII

| Oil phase from liquid-liquid extraction: | Percent w./w. |
|---|---|
| Iso-pentane | 2.3 |
| n-Pentane | 7.1 |
| Iso-hexanes | 14.3 |
| n-Hexanes+cyclopentane | 14.7 |
| Iso-heptanes | 11.9 |
| n-Heptane+cyclohexane+acetone | 7.5 |
| Benzene | 37.0 |
| Others (8 components) | 5.2 |

Column 30 was operated with a reflux ratio of 4:1, a base temperature of 80° C., a feed point temperature of 63–64° C. and a head temperature of 53–55° C. The water feed rate was 1200–1300 ml./hr. at a temperature of 25–30° C. The composition of the heads product is given in Table IX.

Table IX

| | |
|---|---|
| Aliphatic hydrocarbons | 1.2 |
| Acetaldehyde | 1.4–1.7 |
| Methyl formate | 7.0–8.4 |
| Propionaldehyde | 0.3–0.5 |
| Ethyl formate | 2.9 |
| Methyl acetate | 32.7 |
| Acetone | 36–39 |
| Benzene | 8.2 |
| Ethyl acetate | 3.2 |
| Ethyl methyl ketone | 0.4 |
| Water | 3.4 |
| Others (3 components) | 1.5 |

1612 g. of overhead product were obtained.

Column 50 was operated with a reflux ratio of 1:1, a feed temperature of 20° C., a base temperature of 100° C., a feedpoint temperature of 61° C. and a head temperature of 56.5–57° C. The composition of the overhead product is given in Table X.

Table X

| | |
|---|---|
| Aldehydric impurities | Trace |
| Esters | 0.2–0.4 |
| Ethanol | 0.1–0.2 |
| Methanol | 0.7–2.5 |
| Water | 1.2–1.5 |
| Acetone | Remainder |

Column 60 was operated with a reflux ratio of 3:1, a base temperature of 100° C. and a head temperature of 56.5° C.

The acetone feed point temperature was 61–62° C. and a 0.5% w./w. sodium hydroxide solution was added at a rate of 335 ml./hr. and at a feed point temperature of 59° C. 4340 g. of acetone were obtained as overhead product. The results of the specification tests of the product are shown below.

Specification tests on pure acetone (column 60 heads product)

| | |
|---|---|
| Appearance | Pass |
| S.G. 15.5/15.5° C. | 0.798 |
| Distillation range: | |
|     Initial boiling point | 55.9 |
|     Final boiling point | 56.3 |
| Water | 0.43 |
| Miscibility with water | Pass |
| Acidity | Pass |
| Alkalinity | Pass |
| Permanganate test hours | >24 |
| Alcoholic impurities B.S. limit | <½ |

We claim:

1. A process for the purification of acetone from a mixture comprising acetone, methyl acetate, methanol and at least one hydrocarbon which comprises, in sequence, the removal from the mixture of hydrocarbons as organic phase by liquid-liquid extraction with water to give an aqueous phase comprising water, acetone, methyl acetate and methanol, a first hydro-extractive distillation of said aqueous phase to separate methyl acetate as overhead product from a mixture comprising acetone, methanol and water recovered as a base product from the extractive distillation step, partially drying the acetone, methanol and water mixture, feeding the partially dried mixture to a second hydro-extractive distillation wherein methanol and water are removed therefrom as a base product and pure acetone is recovered overhead.

2. The process as claimed in claim 1 wherein the mixture recovered from the hydro-extractive distillation comprises water, acetone and methanol fed through a drying step before recovering the acetone.

3. A process for the purification of acetone from a mixture comprising acetone, methyl acetate, methanol and at least one hydrocarbon which comprises, in sequence, the removal from the mixture of hydrocarbons as organic phase by liquid-liquid extraction with water to give an aqueous phase comprising water, acetone, methyl acetate and methanol, a first hydro-extractive distillation of said aqueous phase to separate methyl acetate as overhead product from a mixture comprising acetone, methanol and water recovered as a base product from the extractive distillation step, partially drying the acetone, methanol and water mixture, recycling the water to the liquid-liquid extraction step, feeding the partially dried acetone, methanol and water to a second hydro-extractive distillation wherein methanol and water are removed therefrom as a base product and pure acetone is recovered overhead.

4. The process as claimed in claim 1, wherein the water from the partial drying step is recycled to the first hydro-extractive distillation step.

5. The process as claimed in claim 1, wherein the water from the partial drying step is recycled both to the liquid-liquid extraction column and to the first hydro-extractive distillation step.

References Cited

UNITED STATES PATENTS

| | | | |
|---|---|---|---|
| 2,166,584 | 7/1939 | Deanesly | 203—71 X |
| 2,662,848 | 12/1953 | Emerson et al. | 203—85 X |
| 2,751,337 | 6/1956 | Goddin et al. | 203—83 |
| 3,276,973 | 10/1966 | Burmaster et al. | 203—71 X |

FOREIGN PATENTS

| | | |
|---|---|---|
| 666,435 | 2/1952 | Great Britain. |

NORMAN YUDKOFF, *Primary Examiner.*

D. EDWARDS, *Assistant Examiner.*